US012645571B2

(12) United States Patent
Benjamin et al.

(10) Patent No.: US 12,645,571 B2
(45) Date of Patent: Jun. 2, 2026

(54) RISK ANALYSIS OF TEST FAILURES THAT OCCURRED DURING A TESTING PHASE OF A CONTINUOUS INTEGRATION PIPELINE

(71) Applicant: RED HAT, INC., Raleigh, NC (US)

(72) Inventors: Stephen Kenneth Benjamin, Boston, MA (US); Xueqin Zhang, Atlanta, GA (US); Forrest Babcock, Raleigh, NC (US); David Michael Eads, Raleigh, NC (US); Deep Mistry, Trenton, NJ (US); Devan Goodwin, Halifax (CA); Ferdinand Dennis Periquet, Concord, NH (US)

(73) Assignee: Red Hat, Inc., Raleigh, NC (US)

( * ) Notice: Subject to any disclaimer, the term of this patent is extended or adjusted under 35 U.S.C. 154(b) by 281 days.

(21) Appl. No.: 18/494,378

(22) Filed: Oct. 25, 2023

(65) Prior Publication Data

US 2025/0138989 A1 May 1, 2025

(51) Int. Cl.
 *G06F 11/3668* (2025.01)
 *G06F 8/71* (2018.01)
(52) U.S. Cl.
 CPC ............ *G06F 11/3688* (2013.01); *G06F 8/71* (2013.01)
(58) Field of Classification Search
 CPC ............................... G06F 8/71; G06F 11/3688
 See application file for complete search history.

(56) References Cited

U.S. PATENT DOCUMENTS

| | | | | |
|---|---|---|---|---|
| 7,506,312 B1 * | 3/2009 | Girolami-Rose | ......... | G06F 8/71 |
| | | | | 717/124 |
| 10,613,970 B1 * | 4/2020 | Jammula | ............. | G06F 11/3688 |
| 10,664,388 B2 * | 5/2020 | Mitchell | ............ | G06F 11/3698 |
| 10,817,283 B1 * | 10/2020 | Naik | .................... | G06F 11/3612 |
| 10,872,026 B2 * | 12/2020 | Wright | ...................... | G06F 8/65 |
| 11,113,185 B2 * | 9/2021 | Sandhu | ..................... | G06F 8/71 |
| 11,726,782 B2 * | 8/2023 | Olejarz | ..................... | G06F 8/77 |
| | | | | 717/101 |
| 11,755,919 B2 * | 9/2023 | Vidal | .................. | G06F 11/3684 |
| | | | | 706/25 |
| 11,809,309 B2 * | 11/2023 | Freeman | ................... | G06F 8/36 |
| 12,386,615 B2 * | 8/2025 | Braunshtein | .............. | G06F 8/71 |
| 2017/0228308 A1 * | 8/2017 | Chan | ................... | G06F 11/3676 |
| 2018/0293158 A1 * | 10/2018 | Baughman | ............... | G06F 8/77 |
| 2019/0227902 A1 * | 7/2019 | Cheng | ................. | G06F 11/3608 |
| 2019/0294531 A1 * | 9/2019 | Avisror | .............. | G06F 11/3698 |
| 2021/0141718 A1 * | 5/2021 | Sandhu | ..................... | G06F 8/60 |

* cited by examiner

*Primary Examiner* — Douglas M Slachta
(74) *Attorney, Agent, or Firm* — Kilpatrick Townsend & Stockton LLP

(57) ABSTRACT

Some examples of the present disclosure relate to risk analysis of test failures that occurred during a testing phase of a continuous integration pipeline. In one particular example, a system can detect a failure of a test during a testing phase of a continuous integration pipeline. The testing phase can involve executing a group of tests in a plurality of configurations prior to merging an update to source code into a code base of a software application. Based on detecting the failure of the test during the testing phase, the system can access historical data associated with prior executions of the test, determine a risk score associated with the failure of the test based on the historical data, and perform an action associated with the source code based on the risk score.

17 Claims, 4 Drawing Sheets

200

| Test Name | Risk Level | Risk Reason |
|-----------|-----------|-------------|
| Test 226a | High | This test has passed 100% of 560 jobs in the last 14 days |
| Test 226b | High | This test has passed 95% of 500 jobs in the last 10 days |
| Test 226c | Low | This test has passed 25% of 560 jobs in the last 14 days |

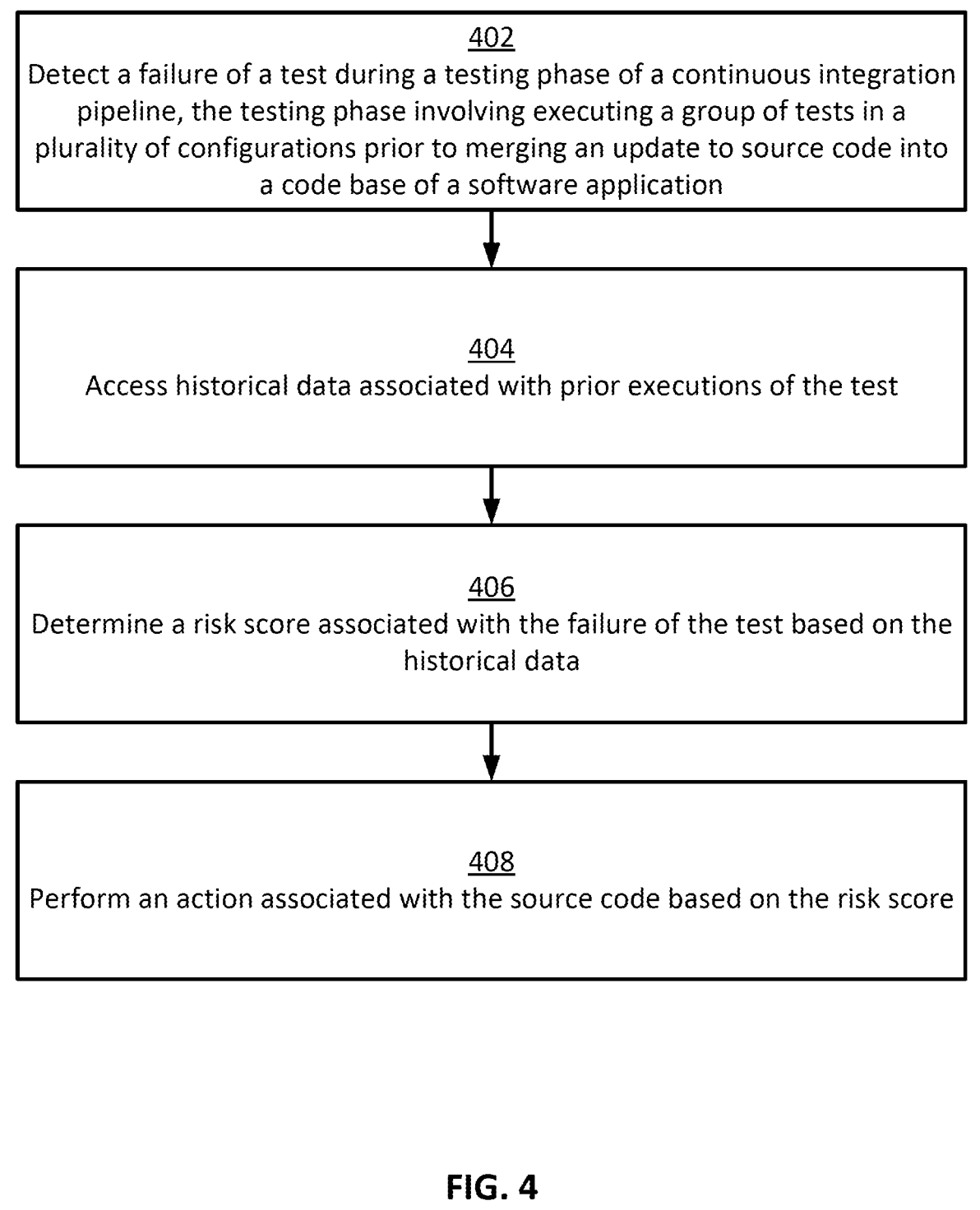

402
Detect a failure of a test during a testing phase of a continuous integration pipeline, the testing phase involving executing a group of tests in a plurality of configurations prior to merging an update to source code into a code base of a software application

404
Access historical data associated with prior executions of the test

406
Determine a risk score associated with the failure of the test based on the historical data

408
Perform an action associated with the source code based on the risk score

FIG. 4

RISK ANALYSIS OF TEST FAILURES THAT OCCURRED DURING A TESTING PHASE OF A CONTINUOUS INTEGRATION PIPELINE

TECHNICAL FIELD

The present disclosure relates generally to continuous integration during software development. More specifically, but not by way of limitation, this disclosure relates to risk analysis of test failures that occurred during a testing phase of a continuous integration pipeline.

BACKGROUND

Continuous integration is the process of merging developers' working copies of source code into a shared mainline code-base at frequent intervals, such as multiple times a day. Continuous integration is implemented using a continuous integration tool, such as Jenkins, Buildbot, Prow, and Travis CI. Developers can submit source code at periodic intervals to the continuous integration tool, which can implement a continuous integration pipeline that attempts to produce a build from the source code. A build is executable code that has been successfully created and tested for a piece of software, such as a software application. Generally, the continuous integration pipeline includes multiple phases that are executed in a sequential order. The continuous integration pipeline can begin with a compilation phase in which the source code is compiled into artifacts. An artifact is executable code that has been compiled from source code for testing. The continuous integration pipeline can then perform a testing phase in which various types of tests (e.g., integration tests, acceptance tests, and unit tests) are executed on the artifacts. The testing phase can enable the developers to rapidly detect defects in the source code, so that they can be corrected as soon as possible.

BRIEF DESCRIPTION OF THE DRAWINGS

FIG. 4 is a flow chart of an example of a process for risk analysis of test failures that occurred during a testing phase of a continuous integration pipeline according to some aspects of the present disclosure.

DETAILED DESCRIPTION

Figure 1:
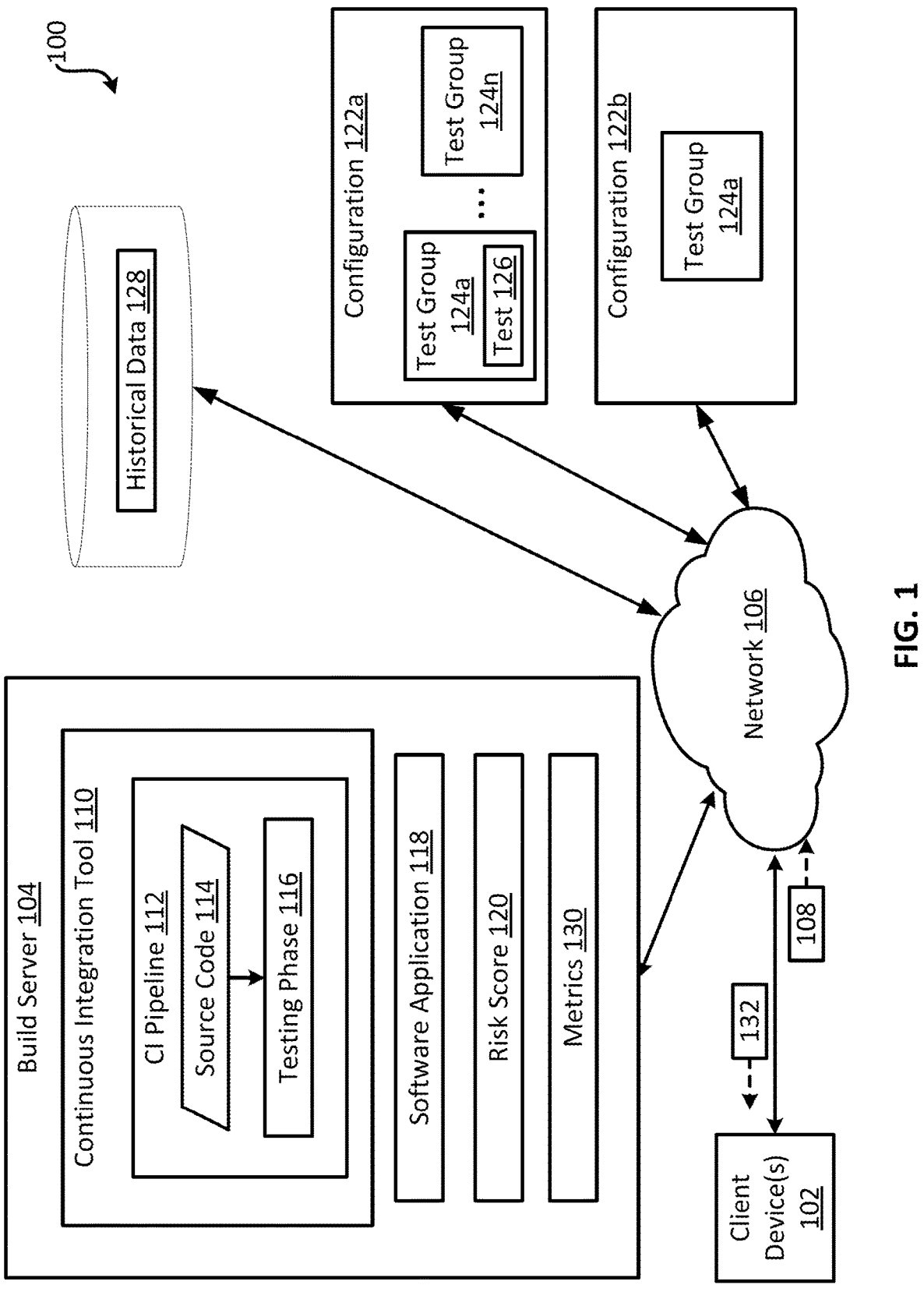
FIG. 1 is a block diagram of an example of a system for risk analysis of test failures that occurred during a testing phase of a continuous integration pipeline according to some aspects of the present disclosure.

A testing phase of a continuous integration pipeline can fail for numerous reasons, some of which may be unrelated to a defect in the underlying source code being tested. For example, a test executed during the testing phase may require certain computing resources (e.g., a database) to be "set up" prior to the test or "torn down" upon completion of the test. Setting up a computing resource may involve creating or configuring the computing resource in a certain way, and tearing down a computing resource may involve deleting or freeing up the computing resource. But if the computing resources are improperly set up, the test may fail. And if the computing resources are improperly torn down, a subsequent test that relies on the same computing resources may fail. Other conflicts leading to failures can also arise between tests. Tests that fail for reasons other than a defect in the underlying source code being tested can be referred to as "false failures." False failures are challenging to detect and often require developers to engage a manual, tedious, time consuming, and complex process to identify and resolve them. In addition, false failures may prevent source code from being merged into a code base of a software application, even though the failure is unrelated to the source code.

Some examples of the present disclosure can overcome one or more of the abovementioned problems by detecting that a test failed a testing phase of a continuous integration pipeline, determining a risk score associated with the failure, and performing an action based on the risk score. This automated process can enable a developer to determine, rapidly, whether the test failure is a false failure or a true failure (i.e., a failure resulting from a defect in the underlying source code being tested). In addition, the automated process may automatically merge source code into a code base if the failure is determined to be a lower risk, meaning that the failure is likely caused by something other than the source code.

As a particular example, a system may receive a pull request for merging an update to source code of a software application into a code base of the software application. A continuous integration pipeline of the system can run a group of ten tests on the update to the source code during a testing phase and determine that one test failed. The system can access historical data of the test that indicates that executions of the test within the past two weeks have a pass rate of 25%. So, the system can determine that the update to the source code is likely not the reason for the failure, and classify the failure as a risk score of low risk. In response, the system can automatically merge the update to the source code into the code base of the software application. In this way, source code can be merged even if tests fail during the testing phase, which can result in reduced resources being used for reconfiguring and retesting the source code.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for risk analysis of test failures that occurred during a testing phase 116 of a continuous integration pipeline 112 according to some aspects. The system 100 includes one or more client devices 102 communicatively coupled to a build server 104 via a network 106, such as a local area network (LAN), wide area network (WAN), the Internet, or any combination of these. The client devices 102 can include computing devices (e.g., desktop computers, laptop computers, mobile devices, or servers) on which one or more developers can edit working copies of source code for software and periodically submit the working copies to the build server 104 as commits 108. A "commit" is source code submitted by a developer to the continuous integration tool 110 for merging into the shared mainline code-base.

The build server 104 can be a computing device such as a server or desktop computer. The build server 104 can receive the committed source code and provide it to a continuous integration tool 110, which implements the continuous integration pipeline 112 that attempts to produce a build of the software using the source code 114. As an example, the source code 114 may be an update to a software application 118. Prior to merging the source code 114 with a code base of the software application 118, representing the build of the software, the continuous integration pipeline 112 can perform a set of tests to determine whether the source code 114 can be merged into the code base without breaking or otherwise reducing performance of the software application 118.

The continuous integration pipeline 112 includes a testing phase 116 in which one or more types of tests are executed on the source code 114 or artifacts generated from the source code 114. Examples of test types include integration tests, acceptance tests, and unit tests. Tests may be organized into one or more test groups 124a-124n, or jobs, that can be executed during the test phase 116. Each of the test groups 124a-124n can include one or more tests that are run in a particular configuration. For instance, FIG. 1 illustrates the system 100 as including configurations 122a-122b. Each of the configurations 122a-122b represents a different combination of a platform, a network environment, an upgrade level, a software release, a security level (e.g., Federal Internet Processing Standards (FIPS)). Example platforms include different cloud providers and bare metal servers. Example network environments include Internet Protocol (IP) versions (e.g., IPv4, IPv6, etc.). So, as a particular example, configuration 122a may be cloud provider A, network environments IPv4 and IPv6, upgrade level x.y.z-1, and software release x.y. Configuration 122b may be cloud provider B, network environment IPv4, upgrade level x.y-1, software release x.y, and a FIPS security level. One or more of the test groups 124a-124n may be run in each configuration.

During the testing phase 116, a test 126 may fail for a variety of reasons. For instance, the test 126 may fail due to update to the source code 114 causing an error. Or, the test 126 may fail because of an issue in the cloud environment in which the test 126 is run, an issue with the test 126 itself, etc. Since a failure may not always indicate an issue with the source code 114, risk analysis can be performed to determine the likelihood of the source code 114 causing a problem for the software application 118 if the source code 114 is merged into the code base of the software application 118.

In some examples, the risk analysis can involve the build server 104 accessing historical data 128 associated with prior executions of the test 126 that failed. The historical data 128 can be stored in a database that is remote from or local to the build server 104. Based on the historical data 128, the build server 104 can determine a risk score 120 associated with the failure of the test 126. For instance, the build server 104 may determine a pass rate of the test 126 within a previous time window. The time period for determining the pass rate may be based on a similarity of the test 126 to historical tests. So, the test 126 being more similar to historical tests may be associated with a shorter time period (e.g., one week), whereas the test 126 being less similar to historical tests may be associated with a longer time period (e.g., one month). The historical data 128 can then be accessed for the determined time period.

The build server 104 can classify the failure of the test 126 as the risk score 120 based on the pass rate. As an example, the failure of the test 126 may be classified as low risk if the pass rate is determined to be between 0% and 80% within the time period. As such, there is likely an issue in the test

126 and not in the update to the source code 114. Additionally, the build server 104 can classify the failure of the test 126 as medium risk if the pass rate is determined to be between 80% and 98% within the time period and as high risk if the pass rate is between 98% and 100% within the time period. High risk can indicate that the reason for the failure is likely due to the source code 114 and not an external factor.

In some examples, the build server 104 may determine and use one or more additional metrics 130 to determine the risk score 120. For example, the metrics 130 may include an amount of network disruption associated with the update to the source code 114, a length of time associated with one or more alerts being fired during the testing phase, a memory utilization metric, and a central processing unit utilization metric associated with the test 126 or the test group during the testing phase 116. These metrics 130 can be collected as the test 126 is run during the testing phase 116. In addition, the historical data 128 can include historical values for the metrics 130. A historical average may be determined for each metric, which can be compared to the values associated with the failure of the test 126. An increase in one or more of the metrics 130 above a threshold compared to the historical data 128 may result in the risk score 120 being determined to be high risk. For example, the metrics 130 may indicate that the test 126 experiences a network disruption time over the ninetieth percentile of the average network disruption for the past three weeks. So, the test 126 can be classified as high risk.

Bugs may also factor into the determination of the risk score 120. For instance, the build server 104 may include or access a bug tracking system. The bug tracking system can store indications of known bugs in the software application 118 or the tests in the test groups 124a-124b. So, even if the test 126 fails, the build server 104 can lookup the bug tracking system to determine the risk score 120. For example, the test 126 can fail, but the bug tracking system can indicate that there is a newly filed bug in the test 126. As a result, the build server 104 can classify the risk score 120 as low risk since it is likely that the failure of the test 126 is due to the bug and not necessarily the update to the source code 114.

Upon determining the risk score 120, the build server 104 may perform an action associated with the source code 114 and based on the risk score 120. For instance, particular risk scores may be associated with particular actions. As an example, for any risk score, the build server 104 may generate a user interface at one or more of the client devices 102 indicating information about the testing phase 116 and failed tests. The user interface may indicate the test groups 124a-124n that were executed during the testing phase 116, the risk scores associated with each test that failed during the testing phase 116, including the risk score 120 for the test 126, and optionally a reason for each of the risk scores. The user interface is further described in FIG. 2.

In some examples, the build server 104 may automatically merge the update to the source code 114 into the code base of the software application 118 if the risk score 120 is below a threshold. For example, if the risk score 120 is low risk or medium risk, then the build server 104 may automatically merge the update into the code base. Alternatively, the build server 104 may prevent the merge of the update to the source code 114 into the code base based on the risk score 120 being above a threshold (e.g., high risk). As such, even if one or more tests fail during the testing phase 116, the build server 104 may still allow the source code 114 to be merged when the failure is determined to be less risky, but prevent the merging for high risk failures.

In some instances, the build server 104 may combine (e.g., average, weighted sum, etc.) the risk scores of some or all of the failed tests during the testing phase 116 to determine a combined risk score. The build server 104 may perform the actions based on the individual risk scores or the combined risk score. So, the build server 104 may merge the update to the source code 114 into the code base if the combined risk score is below a threshold, regardless of the risk scores for the individual tests.

In some examples, if the source code 114 is merged into the code base, the build server 104 can perform another evaluation of test failures to catch any issues introduced to the software application 118. At a predefined interval (e.g., every twenty-four hours), the build server 104 can release a new version of the software application 118 that includes all of the updates to the software application 118 from the previous interval. For instance, the new version can include the source code 114 and any additional updates to the source code made during the last day. The build server 104 can run the test groups 124a-124n on the new version of the software application 118 a number of times each (e.g., ten times) in a subset of the configurations 122a-122b. The build server 104 can then compare results of the executions to the historical data 128 to determine whether there is a regression in a performance of a test. The build server 104 may perform a statistical test such as Fisher's Exact Test to detect a regression in the performance. As an example, the test 126 may fail during the testing of the new version of the software application 118. The build server 104 can determine that historically the test 126 fails 5% of the time, but fails 40% of the time for the new version.

In addition, the build server 104 can perform a binary search to determine the particular update to the source code 114 that caused the regression in the performance of the test 126. Test groups can be run on each code merge within the interval, and the code merges can be bisected into potential regression sources and merges known to not contribute to the regression. The test groups can then be run again on the potential regression sources and the bisection can be repeated until the merge of the update to the source code associated with the regression in the performance of the test 126 is determined. A notification 132 can be sent to the client devices 102 indicating that the update that is associated with the regression.

In some examples, the build server 104 may bypass the risk analysis upon determining a number of tests in the test groups 124a-124n above a threshold failed during the testing phase 116. For instance, if there are four thousand tests in the test group 124a and the build server 104 determines that more than half of the tests failed during the testing phase 116, the build server 104 can bypass the risk analysis and determine the update to the source code 114 is high risk based on the significant number of failed tests. Additional outcomes that can be associated with a high risk include no tests running during the testing phase 116 or something breaking early in the execution of the tests. In any of these cases, the notification 132 can be sent to the client devices 102 indicating the classification of high risk and the reason for the classification.

While FIG. 1 depicts a specific arrangement of components, other examples can include more components, fewer components, different components, or a different arrangement of the components shown in FIG. 1. For instance, in other examples, the database storing the historical data 128 may be internal to the build server 104. Additionally, the client device 102 can be used to implement the process(es) described herein.

Figure 2:
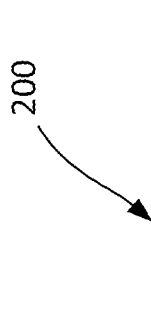
FIG. 2 is an example of a user interface displaying results of risk analysis of test failures that occurred during a testing phase of a continuous integration pipeline according to some aspects of the present disclosure.

FIG. 2 is an example of a user interface 200 displaying results of risk analysis of test failures that occurred during a testing phase of a continuous integration pipeline according to some aspects of the present disclosure. The user interface 200 can be displayed at a client device (e.g., client devices 102 in FIG. 1). The results may be associated with running a group of tests for an update to source code of a software application. For each test of the group of tests that failed during a testing phase of a continuous integration pipeline, the user interface 200 displays the test name, a determined risk level for the test, and a reason for the risk. As illustrated, tests 226a-226n are detected as failing during the testing phase. A risk score corresponding to the risk level for a failed test can be determined based on a comparison of historical data (e.g., pass rate, memory utilization, disruption time, etc.) for the test to data generated while running the test in the testing phase. The risk level for tests 226a-226b is determined to be high and the risk level for test 226c is determined to be low. In some instances, an overall risk level associated with the group of tests may also be determined at displayed at the user interface 200.

The risk reasons displayed at the user interface 200 can be generated based on the historical data for the tests 226a-226c. For instance, tests 226a-226b are indicated as being a high risk because the tests 226a-226b have passed a majority of the time in a previous time window according to the historical data. Alternatively, test 226c is indicated as being a low risk because the test 226b has passed infrequently during a previous time window. A developer may view the user interface 200 and perform an action based on the results. Additionally, or alternatively, another action (e.g., merging source code) may automatically be performed without developer input.

Figure 3:
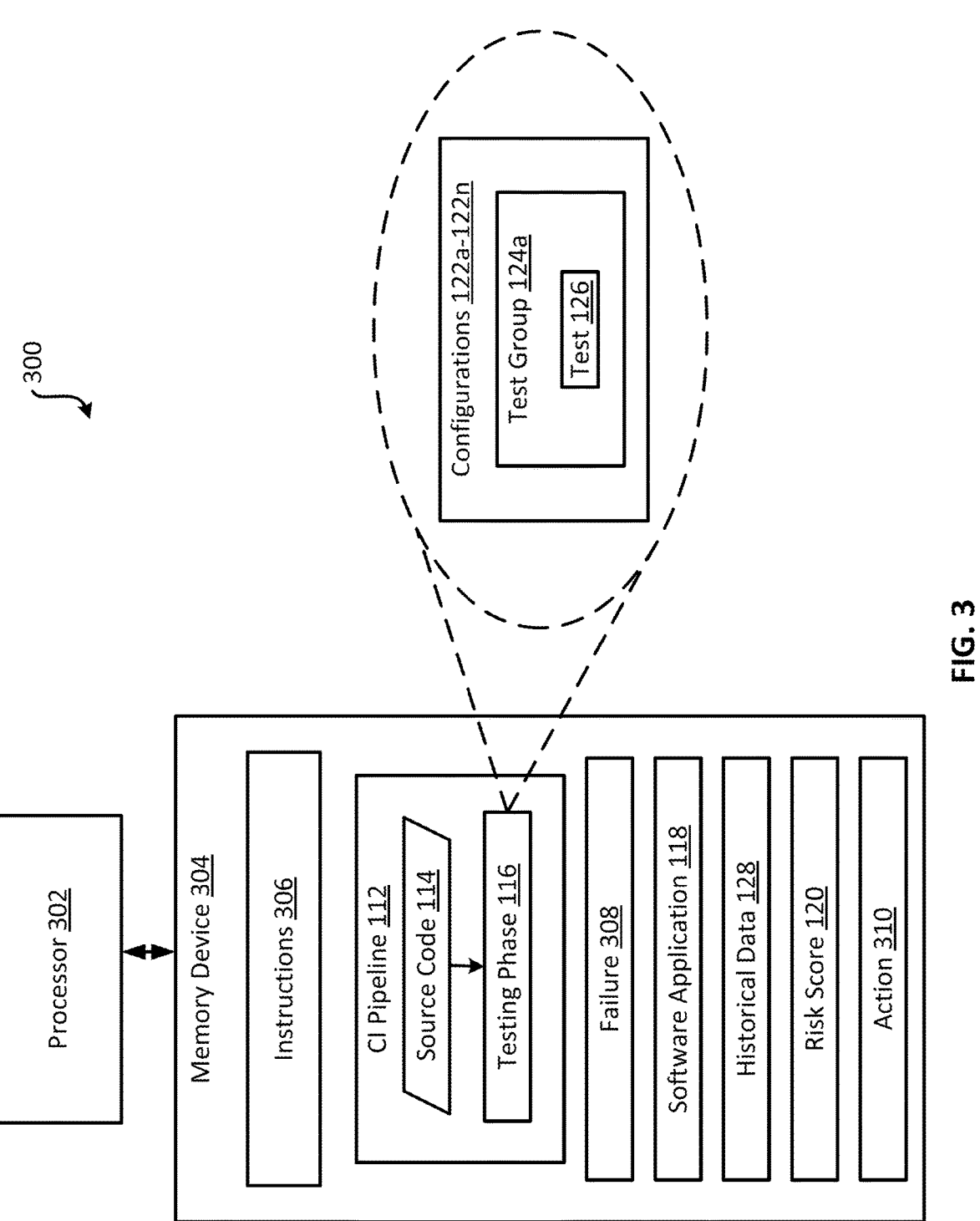
FIG. 3 is a block diagram of another example of a system for risk analysis of test failures that occurred during a testing phase of a continuous integration pipeline according to some aspects of the present disclosure.

FIG. 3 is a block diagram of another example of a system for risk analysis of test failures that occurred during a testing phase of a continuous integration pipeline according to some aspects of the present disclosure. The system 300 can include a processor 302 communicatively coupled to a memory device 304.

The processor 302 can include one processing device or multiple processing devices. The processor 302 can be referred to as a processor. Non-limiting examples of the processor 302 include a Field-Programmable Gate Array (FPGA), an application-specific integrated circuit (ASIC), and a microprocessor. The processor 302 can execute instructions 306 stored in the memory device 304 to perform operations. In some examples, the instructions 306 can include processor-specific instructions generated by a compiler or an interpreter from code written in any suitable computer-programming language, such as C, C++, C#, Java, Python, or any combination of these.

The memory device 304 can include one memory device or multiple memory devices. The memory device 304 can be non-volatile and may include any type of memory device that retains stored information when powered off. Non-limiting examples of the memory device 304 include electrically erasable and programmable read-only memory (EE-PROM), flash memory, or any other type of non-volatile memory. At least some of the memory device 304 includes a non-transitory computer-readable medium from which the processor 302 can read instructions 306. A computer-readable medium can include electronic, optical, magnetic, or other storage devices capable of providing the processor 302 with the instructions 306 or other program code executable to perform operations. Non-limiting examples of a computer-readable medium include magnetic disk(s), memory chip(s), ROM, random-access memory (RAM), an ASIC, a configured processor, and optical storage.

In some examples, the processor 302 can execute the instructions 306 to perform operations. For example, the processor 302 can detect a failure 308 of a test 126 during a testing phase 116 of a continuous integration pipeline 112. The testing phase 116 can involve executing a group of tests (e.g., test group 124a) in a plurality of configurations 122a-122n prior to merging an update to source code 114 into a code base of a software application 118. Additional groups of tests may additionally be executing in various configurations. Based on detecting the failure 308 of the test 126 during the testing phase 116, the processor 302 can access historical data 128 associated with prior executions of the test 136. The processor 302 can determine a risk score 120 (e.g., low, medium, high, a scale of zero to five, etc.) associated with the failure 308 of the test 126 based on the historical data 128. The processor 302 can perform an action 310 associated with the source code 114 based on the risk score 120. For instance, the processor 302 may perform or prevent a merge of the update to the source code 114 into the code base based on the risk score 120. Additionally, the processor 302 may generate a user interface indicating failed tests and associated risk scores for the testing phase 116.

FIG. 4 is a flow chart of an example of a process for risk analysis of test failures that occurred during a testing phase of a continuous integration pipeline according to some aspects of the present disclosure. In some examples, the processor 302 can perform one or more of the steps shown in FIG. 3. For example, the processor 302 can execute the continuous integration pipeline 112 of FIG. 1 to perform one or more of the steps shown in FIG. 4. In other examples, the processor 302 can implement more steps, fewer steps, different steps, or a different order of the steps depicted in FIG. 3. The steps of FIG. 3 are described below with reference to components discussed above in FIGS. 1-3.

At block 402, the processor 302 can detect a failure 308 during a testing phase 116 of a continuous integration pipeline 112. The testing phase 116 can involve executing a group of tests in a plurality of configurations prior to merging an update to source code 114 into a code base of a software application 118. A test failing to run or encountering a problem during running can be considered a failure. So, the processor 302 may detect a test 126 failing during the testing phase 116 based on an information about the test 126 received from the continuous integration pipeline 112.

At block 404, the processor 302 can access historical data 128 associated with prior executions of the test 126. The historical data 128 can include information about test passes and fails for each test of the group of tests. In addition, the historical data 128 can include metrics (e.g., disruption time, CPU usage, memory usage, a time length of alerts firing, etc.) associated with prior executions of the tests. The historical data 128 can be stored in a database that is communicatively coupled with the processor 302.

At block 406, the processor 302 can determine a risk score 120 associated with the failure 308 of the test 126 based on the historical data 128. The processor 302 can determine a pass rate of the test 126 within a previous time period based on the historical data 128. The processor 302 may additionally determine a difference between a metric for the test 126 during the testing phase 116 and previous executions of the test 126 based on the historical data 128. The risk score 120 can be determined based on the pass rate and optionally one or more of the metrics. For instance, the pass rate for the test 126 being 96% within the last seven days and the CPU utilization being in the seventy-fifth percentile for CPU utilizations for the test 126 within the last seven days can result in the processor 302 determining that the risk score 120 for the failure 308 is a high risk. As another example, the pass rate for the test 126 being 15% within the last seven days and the disruption time being in the twentieth percentile for disruption times for the test 126 within the last seven days can result in the processor 302 determining that the risk score 120 for the failure 308 is a low risk.

At block 408, the processor 302 can perform an action 310 associated with the source code 114 based on the risk score 120. The action 310 may involve performing a merge of the update to the source code 114 into the code base in response to determining the risk score 120 is below a threshold or preventing the merge in response to determining the risk score 120 is above a threshold. Additionally, or alternatively, the action 310 may involve generating a user interface indicating the group of tests, the risk scores associated with failed tests, and reasons for the risk scores. If the update to the source code 114 is merged into the code base, the processor 302 can perform additional analysis on a new version of the software application 118 during its next release to determine whether the update introduced an issue to the software application 118. Accordingly, updates may be allowed to merge automatically even if a test fails, with backup measures are in place to catch any errors.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
   a processor; and
   a memory device storing program code that is executable by the processor for causing the processor to perform operations including:
   detecting a failure of a test during a testing phase of a continuous integration pipeline, the testing phase involving executing a group of tests in a plurality of configurations prior to merging an update to source code into a code base of a software application; and
   based on detecting the failure of the test during the testing phase:
   accessing historical data associated with prior executions of the test, the historical data indicating a pass rate of the test over a previous time window;
   determining a risk score associated with the failure of the test based on the pass rate of the test over the previous time window; and
   performing an action associated with the source code based on the risk score, the action comprising at least one of:
   merging the update to the source code into the code base in response to the risk score being below a threshold, or
   preventing merging the update into the code base in response to the risk score being above the threshold.

2. The system of claim 1, wherein the operations further comprise:
   performing the group of tests a number of times in each configuration of a subset of the plurality of configurations subsequent to merging the update to the source code and one or more additional updates to the source code into the code base;

determining, based on an execution of a statistical test, that the update to the source code is associated with a regression in a performance of the test; and transmitting a notification to a client device that the update to the source code is associated with the regression in the performance of the test.

3. The system of claim 1, wherein the operations further comprise:

determining a combined risk score by combining a set of risk scores of a set of failed tests during the testing phase; and performing the action based on the combined risk score.

4. The system of claim 1, wherein the operations further comprise:

accessing one or more metrics associated with the testing phase for the group of tests, the one or more metrics comprising an amount of network disruption associated with the update to the source code, a length of time associated with one or more alerts being fired during the testing phase, a memory utilization metric, and a central processing unit utilization metric; and determining the risk score associated with the failure of the test based on the one or more metrics.

5. The system of claim 1, wherein the action comprises:

generating a user interface indicating the group of tests, the risk score associated with the failure of the test, one or more additional risk scores associated with one or more additional failures of tests in the group of tests, and reasons for the risk score and the one or more additional risk scores.

6. The system of claim 1, wherein the operations further comprise determining the risk score by:

classifying the failure of the test as the risk score based on the pass rate of the test within the previous time window.

7. A computer-implemented method comprising:

detecting a failure of a test during a testing phase of a continuous integration pipeline, the testing phase involving executing a group of tests in a plurality of configurations prior to merging an update to source code into a code base of a software application; and based on detecting that the test failed the testing phase:

accessing historical data associated with prior executions of the test, the historical data indicating a pass rate of the test over a previous time window;

determining a risk score associated with the failure of the test based on the pass rate of the test over the previous time window; and performing an action associated with the source code based on the risk score, the action comprising at least one of:

merging the update to the source code into the code base in response to the risk score being below a threshold, or preventing merging the update into the code base in response to the risk score being above the threshold.

8. The method of claim 7, further comprising:

performing the group of tests a number of times in each configuration of a subset of the plurality of configurations subsequent to merging the update to the source code and one or more additional updates to the source code into the code base;

determining, based on an execution of a statistical test, that the update to the source code is associated with a regression in a performance of the test; and transmitting a notification to a client device that the update to the source code is associated with the regression in the performance of the test.

9. The method of claim 7, further comprising:

determining a combined risk score by combining a set of risk scores of a set of failed tests during the testing phase; and performing the action based on the combined risk score.

10. The method of claim 7, further comprising:

accessing one or more metrics associated with the testing phase for the group of tests, the one or more metrics comprising an amount of network disruption associated with the update to the source code, a length of time associated with one or more alerts being fired during the testing phase, a memory utilization metric and a central processing unit utilization metric; and determining the risk score associated with the failure of the test based on the one or more metrics.

11. The method of claim 7, wherein performing the action comprises:

generating a user interface indicating the group of tests, the risk score associated with the failure of the test, one or more additional risk scores associated with one or more additional failures of tests in the group of tests, and reasons for the risk score and the one or more additional risk scores.

12. The method of claim 7, wherein determining the risk score comprises:

classifying the failure of the test as the risk score based on the pass rate of the test within the previous time window.

13. A non-transitory computer-readable medium comprising program code that is executable by a processor for causing the processor to perform operations including:

detecting a failure of a test during a testing phase of a continuous integration pipeline, the testing phase involving executing a group of tests in a plurality of configurations prior to merging an update to source code into a code base of a software application; and based on detecting that the test failed the testing phase:

accessing historical data associated with prior executions of the test, the historical data indicating a pass rate of the test over a previous time window;

determining a risk score associated with the failure of the test based on the pass rate of the test over the previous time window; and performing an action associated with the source code based on the risk score, the action comprising at least one of:

merging the update to the source code into the code base in response to the risk score being below a threshold, or preventing merging the update into the code base in response to the risk score being above the threshold.

14. The non-transitory computer-readable medium of claim 13, wherein the operations further comprise:

performing the group of tests a number of times in each configuration of a subset of the plurality of configurations subsequent to merging the update to the source code and one or more additional updates to the source code into the code base;

determining, based on an execution of a statistical test, that the update to the source code is associated with a regression in a performance of the test; and transmitting a notification to a client device that the update to the source code is associated with the regression in the performance of the test.

15. The non-transitory computer-readable medium of claim 13, wherein the operations further comprise:

determining a combined risk score by combining a set of risk scores of a set of failed tests during the testing phase; and performing the action based on the combined risk score.

16. The non-transitory computer-readable medium of claim 13, wherein the operations further comprise:

accessing one or more metrics associated with the testing phase for the group of tests, the one or more metrics comprising an amount of network disruption associated with the update to the source code, a length of time associated with one or more alerts being fired during the testing phase, a memory utilization metric and a central processing unit utilization metric; and determining the risk score associated with the failure of the test based on the one or more metrics.

17. The non-transitory computer-readable medium of claim 13, wherein the operations further comprise determining the risk score by:

classifying the failure of the test as the risk score based on the pass rate of the test within the previous time window.

\* \* \* \* \*